US005198962A

United States Patent [19]

Tyson

[11] Patent Number: 5,198,962

[45] Date of Patent: Mar. 30, 1993

[54] LIGHTING SYSTEM

[76] Inventor: Glenn M. Tyson, 5814 Irving Ave., La Crescenta, Calif. 91214

[21] Appl. No.: 653,619

[22] Filed: Feb. 11, 1991

Related U.S. Application Data

[62] Division of Ser. No. 389,363, Aug. 3, 1989, Pat. No. 5,041,950.

[51] Int. Cl.[5] .................... H02B 1/00

[52] U.S. Cl. .................... 361/380; 174/52.2; 361/426; 361/428; 439/736

[58] Field of Search .................... 174/50.52, 50.56, 50.55, 174/52.2; 336/96; 361/331, 334, 380, 426, 428; 439/712, 722, 736

[56] References Cited

U.S. PATENT DOCUMENTS

| | | | |
|---|---|---|---|
| 1,240,452 | 9/1917 | Hotchkin | 362/373 |
| 3,845,435 | 10/1974 | Georgopulos | 174/52.2 |
| 3,869,563 | 3/1975 | Ocken, Jr. | 174/52.2 |
| 3,949,213 | 4/1976 | Paitchell | 362/101 |
| 4,000,406 | 12/1976 | Bhavsar | 336/96 |
| 4,143,508 | 3/1979 | Ohno | 174/52.2 |
| 4,343,033 | 8/1982 | Suzuki | 362/267 |
| 4,433,366 | 2/1984 | Wade | 362/373 |
| 4,460,944 | 7/1984 | Gordbegli et al. | 362/145 |
| 4,539,629 | 3/1986 | Poppenheimer | 362/267 |
| 4,574,337 | 3/1986 | Poppenheimer | 362/267 |
| 4,617,616 | 10/1986 | Juell et al. | 362/267 |
| 4,694,119 | 9/1987 | Groenewegen | 174/52.2 |
| 4,695,930 | 9/1987 | Wierzbicki et al. | 362/294 |
| 4,931,915 | 6/1990 | Quiogue | 362/267 |
| 4,956,561 | 9/1990 | Tamer | 174/52.2 |

*Primary Examiner*—Gregory D. Thompson
*Attorney, Agent, or Firm*—Lyon & Lyon

[57] ABSTRACT

A light assembly for outdoor purposes utilizing a supportive and corrosion protective housing allowing below grade placement. Individualized lamp and electrical component assemblies are separately sealed from water infiltration and are located within the housing with electrical connections provided by submersible rated cable and connectors. A potting material in the lamp assembly encapsulates the electrical wires which are further surrounded by a solid soldering compound barrier. A closure assembly separately seals the electrical components using a mounting base, a harness and a potting body which form one body through molding of the potting body about the remainder of the elements. A harness assembly wicking barrier is employed which further isolates the transformer from water infiltration. Bare metal strips forming conductors are encapsulated in the potting material. A face ring with slotted openings permits air flow and water entry into the housing for cooling the lamp assembly. A junction box that is separately sealed and located within the housing allows external power into the light assembly and acts as a grounding source.

4 Claims, 2 Drawing Sheets

LIGHTING SYSTEM

This is a division of application Ser. No. 389,363, filed Aug. 3, 1989, now U.S. Pat. No. 5,041,950.

BACKGROUND OF THE INVENTION

The field of the present invention is lighting systems for outdoor lighting purposes.

Outdoor lighting systems have an infinite number of applications for outdoor illumination. Such systems are used to illuminate and thus to enhance the effects of flagpoles, signs, shrubbery and other architectural focal points. Outdoor lighting can provide general flood lighting to areas for security purposes and also provide spot lighting where desired.

The placement and location of conventional lighting systems for outdoor lighting is severely restricted. Conventional systems are especially vulnerable to the destructive effects of corrosive soils, thus an above grade placement is normally required. Such a placement can detract from the aesthetics of the lighted area and can restrict the utility of such systems. Also, such conventional systems are not designed to handle human foot traffic, thus placement of conventional systems is further restricted. Conventional systems are also vulnerable to moisture and water intrusion.

To overcome these difficulties, outdoor lighting systems have been developed which employ a fully sealed system of structural material. Conventional systems cannot tolerate water entry into the housing, so an open housing allowing air and water to flow therethrough cannot be used for cooling the lamp. Any moisture entry into such systems has the potential to cause a shorting out of the electrical system and rapid corrosion. Thus, outdoor systems have required sealing. Because of requirements to completely seal the outdoor systems, such devices are expensive, difficult to repair and difficult to cool. The poor thermodynamic characteristics dictate size and limit light output. The use of thick materials such as lenses and housings can also add to the cooling problem.

The design of conventional outdoor systems can make them difficult to relamp; and field personnel can encounter several obstacles when attempting to repair such systems. Numerous fasteners are typically used in sealing these systems. The reliance on such fasteners can make removal of the lamp difficult and repeated working of the fasteners can deteriorate their performance and eventually affect the integrity of the seal. Field repairs can trap humidity in the lamp, which eventually condenses inside the lamp and has the potential to short out and/or corrode the electrical system. Such cyclical intrusion causes conventional systems to have a very high cost of repair and maintenance with limited utility.

SUMMARY OF THE INVENTION

The present invention pertains to lighting systems and the construction thereof that are both efficient and reliable for outdoor applications. Such systems provide versatile designs for maximum utility and lower maintenance costs over conventional outdoor lighting systems.

In a first aspect, the present invention contemplates an exterior housing to protect the system from corrosive soil conditions and to provide support and structural protection for the internal components. Components not capable of withstanding moisture and corrosive conditions may be positioned and sealed from moisture entry within the housing. The lamp socket may be sealed and placed within the housing as well.

In a further aspect of the present invention, wicking barriers may be employed to protect the components from water intrusion. A method of creating such a wicking barrier includes the soldering of a portion of a stranded electrical connector and potting the soldered portion in the creation of the barrier.

A wicking barrier is alternatively contemplated employing a bare, conductive metal strip held in a harness and submerged in potting material. Attachment elements may be mutually spaced on the strip to receive connectors in a displaced arrangement.

In a further aspect of the present invention a face ring may be provided as an external cover that is contiguous with the lamp assembly and the housing. This external face ring is slotted to allow entry of air and water to dissipate heat away from the lamp. Both the lens and the face ring may be designed to support human foot traffic, allowing precise placement of the light assembly.

In another aspect of the present invention, a potting structure is employed having first mounts for electrical components and an encasing potting body made integral with the mounts and encasing the components. Controlled placement and sealing of the electrical components may be assured with such a structure.

Employing the foregoing features, both airflow and water in the housing may be used to cool the lamp. This provides improved thermodynamic characteristics for efficient operation of the lamp, enabling more design latitude The use of a face ring can be advantageous because it can be easily removed to gain access to the interior of the housing as simple attachment mechanisms may be used to hold the face ring to the housing. Repairs can be simplified in the field because the individually sealed lamp assembly or transformer ballast package may be replaced should the item fail to function.

Accordingly, it is an object of the present invention to provide a lighting assembly with improved and reliable outdoor lighting features. It is a further object to provide improved sealing mechanisms for lighting assemblies. Other and further objects and advantages will appear hereinafter.

DETAILED DESCRIPTION OF THE PREFERRED EMBODIMENT

Figure 1:
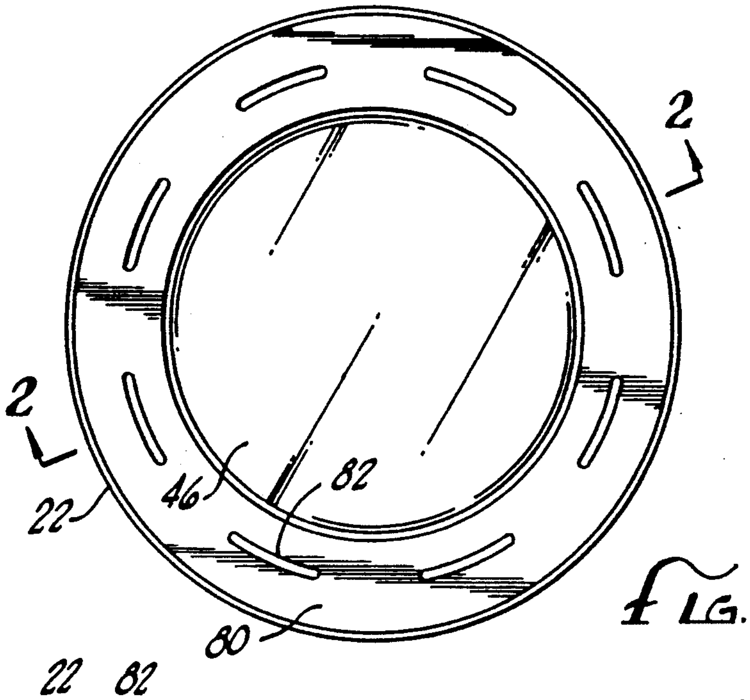
FIG. 1 is a plan view of the present invention looking at the face ring and lamp assembly.

Turning in detail to the drawings, a light assembly positionable with a lens at grade level and the remainder of the assembly below grade is illustrated. A structurally supportive housing 10 is illustrated which may take on any convenient form but is illustrated in the preferred embodiment to be generally circular in cross section and fabricated from two pieces 12 an 14 which are joined near the center of the housing. A notch 16 is provided in the side of the housing 10 for receipt of a junction box. Inwardly extending flanges 18 raise any components positioned within the housing 10 above the bottom thereof. One end of the housing 10 is open. This opening 20 is surrounded by an upper rim 22 of the housing 10 which is preferably arranged at approximately ground level 24.

A junction box 26 is located in the notch 16 of the housing 10. The junction box 26 is enclosed in a conventional manner so as to prevent moisture intrusion. A conduit 28 is shown extending through a port 30 in the notch 16 and through the wall of the junction box 26 to provide entry thereto for wires 32. The conduit 28 may be threaded to engage the wall of the housing 10 or junction box 26 or may be otherwise retained in a conventional manner. An access port 34 provides communication between the junction box 26 and the interior of the housing 10. A cord seal 36 seals the access port 34 about an electrical conductor 38. The wires 32 are spliced with the conductor 38 in the protection of the junction box 26.

Located at the opening 20 is a lamp assembly, generally designated 40. The lamp assembly 40 includes a socket enclosure 42. The socket enclosure 42 is conveniently circular in cross section terminating at an outwardly extending flange 44. The socket enclosure 42 narrows at its lower extent where it extends into the housing 10. Within the socket enclosure 42 a lamp cavity is defined which is closed at its upper extent by a lens 46. The lens 46 is preferably of tempered glass to withstand foot traffic and may have a broad range of optical properties such as coloring, frosting, focusing or diverging light. The lens 46 has a mounting flange 48 about which is positioned a ring gasket 50. Outwardly of the mounting flange 48 and the ring gasket 50, a clamp ring is positioned to hold the lens in sealed engagement with the socket enclosure 42.

Within the lamp cavity, a reflector 52 is positioned. The reflector 52 has a hole 54 through which a light bulb 56 extends. The reflector 52 is positioned on the socket enclosure 42 at its upper end. A socket locating bracket 58 extends downwardly from the reflector 52. A socket 60 is located in an adjustment bracket 62 fixed to the bracket 58. The two brackets 58 and 62 are bolted together with one of the brackets having slots for receipt of the bolt such that the socket 60 and light bulb 56 may be tipped relative to the reflector 52 in order to redirect the light emanating from the lamp.

At the bottom end of the socket enclosure 42, a submersible connector 64 is mounted through the wall. An electrical conductor 66 is associated with the submersible connector 64, extending to submersible connector leads 68. Socket leads 70 extend from the socket 60 and are electrically coupled with the leads 68. Solidified solder beads 72 join the paired leads with the leads not otherwise electrically coupled. By using a solder bead as the sole coupling between leads, water cannot pass through the stranded electrical connector from the socket 60 to the connector 64 or visa versa. Potting material 74 is then hardened in place about the leads and the solder beads 72 to provide a complete barrier to the passage of moisture along the electrical conductor 66 inwardly of the insulation. Outwardly of the insulation, the submersible connector 64 prevents such transmission of moisture in association with the potting material 74.

The lamp assembly 40, including the lens 46 is mounted in the housing 10 by means of mounting blocks 76. The mounting blocks 76 include inwardly extending flanges 78 upon which the ring gasket 50 sits. At the top edge of the housing 10 at the opening 20, the lamp assembly is spaced inwardly from the rim 22. Thus, an annular space is presented which leads down into the main cavity of the housing 10. Positioned over the space to span between the rim 22 and the lamp assembly 40 is a face ring 80. The face ring 80 has multiple openings or holes 82 which allow for the passage of water and air. These holes provide for cooling of the entire assembly. The face ring 80 may be held in place by any conventional means such as flush mounted screws or the like.

Figure 4:
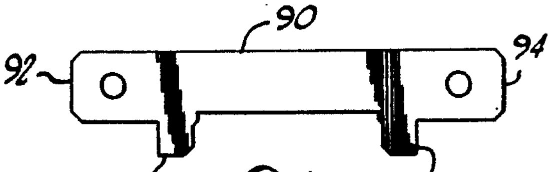
FIG. 4 is a plan view of an elongated metal strip of the harness assembly of FIG. 3.
Figure 5:
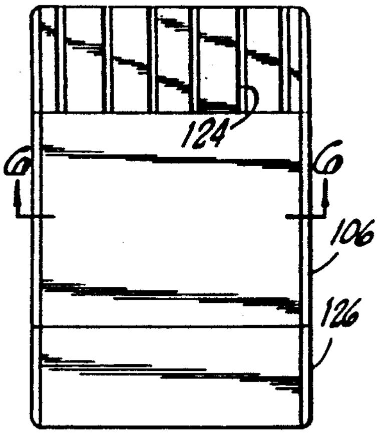
FIG. 5 is a plan view of the harness shown in the harness assembly of FIG. 3.
Figure 3:
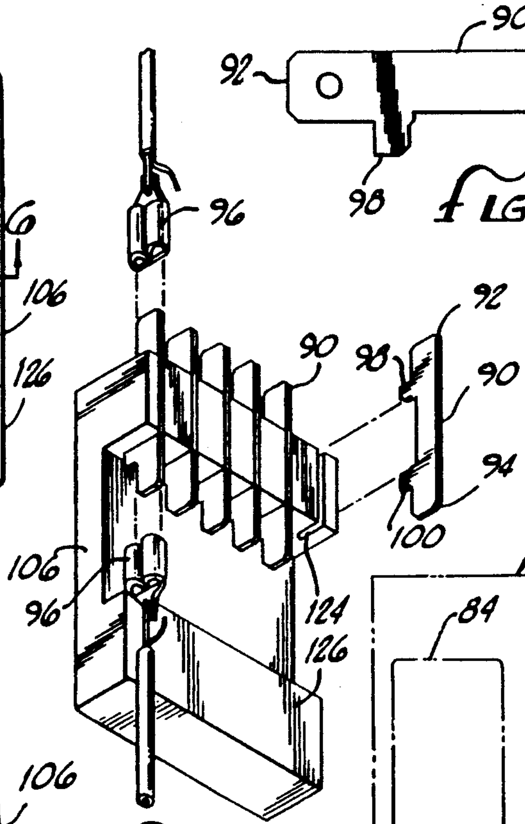
FIG. 3 is an oblique view of a wicking barrier harness assembly that is located within the potting structure.
Figure 6:
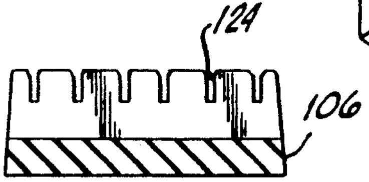
FIG. 6 is a cross-sectional view of the harness taken along line 6—6 of FIG. 5.

Electrically coupled between the junction box 26 and the lamp assembly 40 by means of the electrical conductors 38 and 66 is an electrical circuit. In the present circumstance, the circuit includes a capacitor 84, an igniter 86 and a transformer 88. These components are shown in phantom in association with the closure system therefor. Further, the electrical circuit incudes a wicking barrier system. Naturally, the several elements are electrically coupled in a conventional fashion. The wicking barrier is defined in this instance by a bare, elongate conductive strip 90 of noncorrosive material. A textured copper strip has been found advantageous. Several strips 90 may be employed as needed for electrical connections. FIGS. 3 and 4 specifically illustrate such strips 90. The strips 90 each include posts 92 and 94 at the ends thereof. They are sized to receive conventional conductor clips 96 as best illustrated in FIG. 3. The posts are mutually displaced from one another to insure an adequate potting barrier thickness between posts as will be discussed below. Anchor elements 98 and 100 provide for positioning of the strips 90 in a harness.

A closure assembly, generally designated 102, for containing the electrical components of the lighting circuit forms a complete potting of the elements. The assembly 102 is formed in the preferred embodiment from three separate constructions. A potting base 104, a harness 106 and a final potting body 108. Preferably, the potting base 104, harness 106 and potting body 108 are all of the same material. The material is to exhibit a number of physical properties to cope with the potentially harsh conditions. The potting material needs to exhibit multi-pour bonding, high heat transfer, resistance to thermal stress and impact strength and be fireproof and water tight. Compounds of epoxy resin potting compounds are contemplated. The potting base 104 and harness 106 may be separately molded, assembled together and with the electrical components, including the capacitor 84, igniter 86, transformer 88, strips 90 and electrical conductors attached by the clips 96, finally assembled by molding the potting body 108 thereabout.

Figure 9:
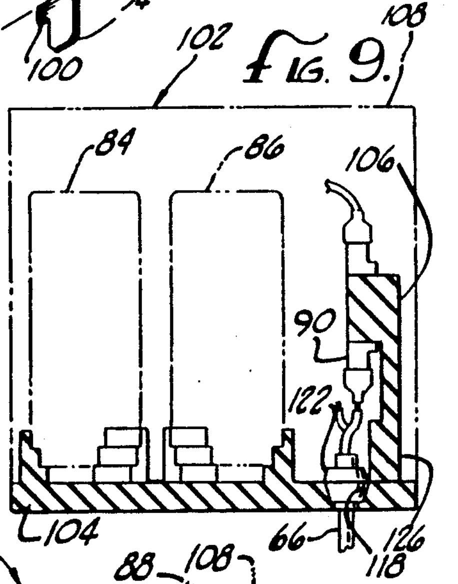
FIG. 9 is a cross-sectional side view taken along line 9—9 of FIG. 7.
Figure 7:
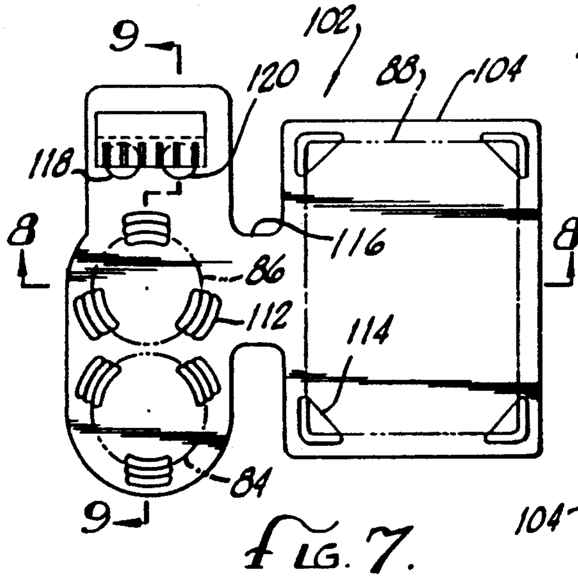
FIG. 7 is a plan view of the potting base and harness illustrating the electrical components in phantom.

The potting base 104 is conveniently a plate upon which are integrally formed sockets 112 for each of the capacitor 84 and igniter 86. Each socket is defined by three upraised portions to snugly receive these elements. A socket 114 is also provided for the transformer 88. This socket 114 is defined by four corner elements which receive a preselected transformer. The base 104 is shown to be in two segments connected by a thinner neck portion 116. This can be employed for reducing the amount of material used, presenting a thinner wall of material about the transformer for more effective heat transfer to the outer surface of the closure assembly 102 and reduced heat transfer between the transformer and the capacitor. Finally, the base 104 includes two holes 118 and 120. The holes extend through the base 104 and may be tapered as best seen in FIG. 9. The electrical conductors 38 and 66 extend through the holes 118 and 120 to terminate at multiple clips 96. Stress reducing collars 122 are positioned about the conductors to better prevent forced extraction or breaking of the insulation. The collars 122 may also be conical and are showed to have a second conical portion facing in the opposite direction.

The harness 106 includes slots 124 into which the strips 90 may be positioned. It is preferable that the slots 124 are wider than the strips 90 in order that potting material may migrate about the strips 90 to seal same along their length. Toward this end, the anchor elements 98 and 100 may provide a grip on the harness 106 to retain the strips 90 in position. The harness 106 includes a stand 126 such that the harness 106 may be positioned on top of the potting base 104. This arrangement is illustrated in FIGS. 8 and 9.

Figure 2:
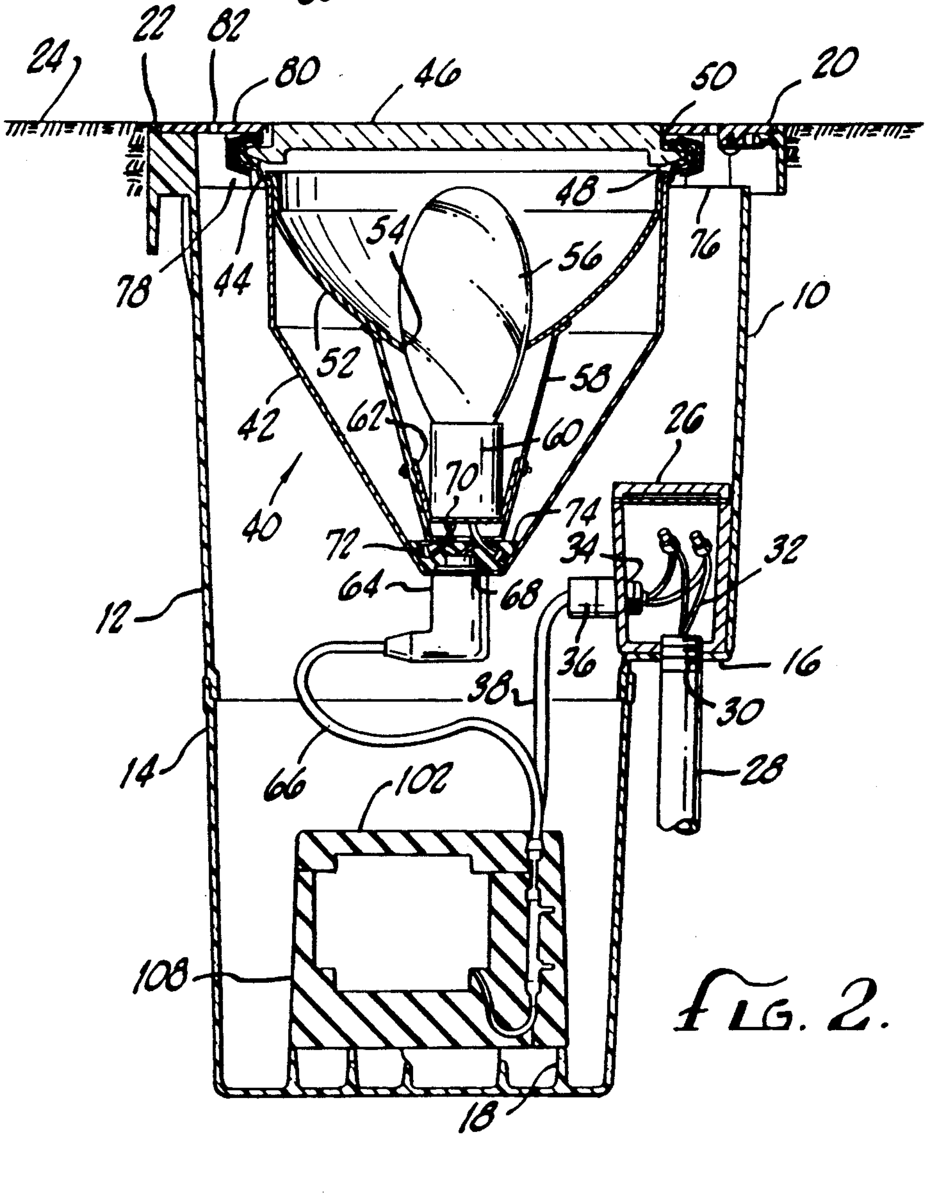
FIG. 2 is a cross-sectional side view of the preferred embodiment of the present invention.
Figure 8:
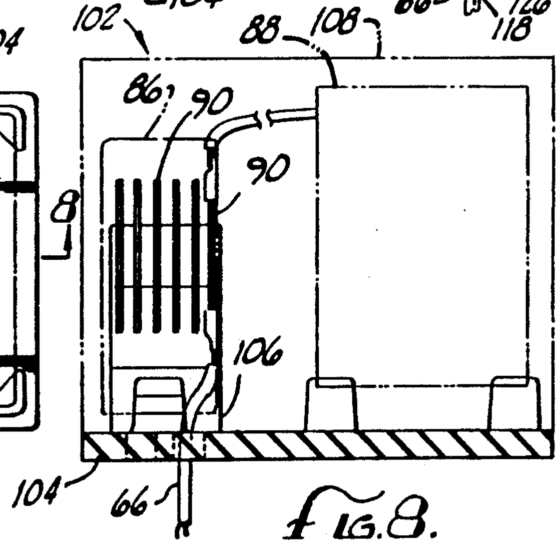
FIG. 8 is a cross-sectional side view taken along line 8—8 of FIG. 7.

Once having assembled all of the electrical elements on the potting base 104 and harness 106, the entire assembly may be encased with further molding material to define a potting body 108, outlined in phantom in FIGS. 8 and 9 and shown in full in FIG. 2. The property of the potting material is such that there is good multipour bonding to form, in effect, the potting base 104, the harness 106 and the potting body 108 into a single integral unit defining the closure assembly 102. The sole entrance to the closure assembly 102 is provided at the holes 118 and 120. However, a wicking barrier is employed using strips 90 to which the potting compound also adheres. Thus, the closure is complete.

In operation, the aluminum junction box 26 provides an entrance for the electrical conduits into the housing 10 and a grounding to the conduit 28. The electrical circuit is separately and permanently encased to protect the most sensitive of the electrical components Likewise, the lamp assembly 40 is individually sealed. This seal is preferably reenterable in order that light bulbs may be changed. By separately sealing the lamp assembly 40 from the remaining components, the light bulb 56 may be changed without exposing the remaining components. The junction box must also be enterable at least for initial assembly with a lighting system. Cooling is accomplished, as noted above, through the multiple openings 82. As can be appreciated, water can enter and even fill up the housing 10 through these multiple openings 82. Thus, either air or water may provide the cooling medium for the components.

Accordingly, an improved outdoor lighting system is disclosed. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A closure system comprising a potting base including one or more sockets;

a harness having slots;

bare electrical connectors having two spaced terminals and being positioned in said slots;

a potting body enclosing said one or more sockets of said potting base, said bare electrical connectors, including said two spaced terminals of each said bare electrical connectors, and said slots of said harness by molding said potting body about at least a portion of said base and at least a portion of said harness.

2. The closure system of claim 1 wherein said base, said harness and said potting body are of the same material exhibiting substantial multi-pour bonding.

3. The closure system of claim 1 wherein said potting base includes holes therethrough, said harness being positioned adjacent said holes for receipt of electrical conductors through said holes to said harness.

4. The closure system of claim 3 wherein said holes diverge toward said harness.

* * * * *